United States Patent
Takahara et al.

(10) Patent No.: US 7,357,083 B2
(45) Date of Patent: Apr. 15, 2008

(54) INITIATOR

(75) Inventors: Isamu Takahara, Nagoya (JP); Kazuo Nose, Fuchu (JP); Akitoshi Yoshigai, Okazaki (JP)

(73) Assignees: Toyota Jidosha Kabushiki Kaisha, Toyota (JP); Hino Motors, Ltd., Tokyo (JP); Toyota Shatai Kabushiki Kaisha, Kariya-shi (JP)

( * ) Notice: Subject to any disclaimer, the term of this patent is extended or adjusted under 35 U.S.C. 154(b) by 369 days.

(21) Appl. No.: 10/509,242

(22) PCT Filed: Mar. 17, 2003

(86) PCT No.: PCT/JP03/03147

§ 371 (c)(1),
(2), (4) Date: Dec. 9, 2004

(87) PCT Pub. No.: WO03/083403

PCT Pub. Date: Oct. 9, 2003

(65) Prior Publication Data

US 2005/0115453 A1    Jun. 2, 2005

(30) Foreign Application Priority Data

Mar. 28, 2002    (JP) ............................. 2002-092668

(51) Int. Cl.
*B60R 21/26* (2006.01)
*F42B 3/10* (2006.01)

(52) U.S. Cl. ............... 102/530; 102/202.7; 102/202.5; 102/202.14; 280/737

(58) Field of Classification Search ............... 102/530, 102/531, 202.5, 202.6, 202.7, 202.8, 202.9, 102/202.11, 202.12, 202.14; 280/736, 737, 280/741, 742
See application file for complete search history.

(56) References Cited

U.S. PATENT DOCUMENTS

| 5,005,486 | A | * | 4/1991 | Lenzen ........................ 102/531 |
| 5,423,261 | A |   | 6/1995 | Bernardy et al. |
| 5,531,473 | A | * | 7/1996 | Rink et al. .................. 280/737 |
| 5,603,525 | A | * | 2/1997 | Zakula ........................ 280/737 |
| 6,116,642 | A | * | 9/2000 | Shirk et al. .................. 280/737 |
| 6,295,935 | B1 |  | 10/2001 | Swann et al. |
| 6,338,500 | B1 |  | 1/2002 | Perotto |
| 6,923,122 | B2 | * | 8/2005 | Hennings et al. ......... 102/202.7 |
| 7,263,929 | B2 | * | 9/2007 | Takahara .................. 102/202.7 |

FOREIGN PATENT DOCUMENTS

| EP | 0 926 461 A1 | 6/1999 |
| EP | 1 164 349 A1 | 12/2001 |
| JP | U 2-144857   | 12/1990 |

(Continued)

*Primary Examiner*—James S Bergin
(74) *Attorney, Agent, or Firm*—Oliff & Berridge, PLC (57) ABSTRACT

An initiator is incorporated in an inflator in order to trigger the inflator through propagation of flame from an initiating explosive to a gas generator of the inflator. The initiator includes a closed-bottomed tubular capsule for accommodating the initiating explosive. A tubular portion of the capsule includes a plurality of rupture-accelerating means (grooves each having a V-shaped cross section) for accelerating rupture upon ignition of the initiating explosive, whereby flame propagates from the initiating explosive to the gas generator of the inflator along a plurality of directions.

16 Claims, 6 Drawing Sheets

| | FOREIGN PATENT DOCUMENTS | | | JP | A 2001-21293 | 1/2001 |
|---|---|---|---|---|---|---|
| | | | | JP | A 2001-512227 | 8/2001 |
| JP | A 10-213397 | 8/1998 | | KR | A 2001-0002053 | 1/2001 |
| JP | A 11-59318 | 3/1999 | | WO | WO 02/08028 A1 | 1/2002 |
| JP | A 11-91495 | 4/1999 | | WO | WO 02/073117 A1 | 9/2002 |
| JP | A 11-241900 | 9/1999 | | | | |
| JP | A 11-301402 | 11/1999 | | * cited by examiner | | |
| JP | A 2000-168487 | 6/2000 | | | | |

INITIATOR

TECHNICAL FIELD

The present invention relates to an initiator to be incorporated in, for example, an inflator of an airbag apparatus to be mounted in a vehicle.

BACKGROUND ART

A conventional initiator of this kind includes a pair of electrode pins held together via an insulating member; a bridge wire connected to the electrode pins and generating heat upon energization; an ignitable material (an initiating explosive) which is ignited through exposure to heat generated by the bridge wire; and a casing (capsule) for accommodating the bridge wire and the ignitable material in a sealed condition, as disclosed in, for example, Japanese Patent Application Laid-Open (kokai) No. 11-301402.

In the above-mentioned conventional initiator, the direction in which the electrode pins extend (hereinafter called the "extending direction") and the flame propagation direction of the ignitable material (initiating explosive) are substantially the same (substantially aligned with each other). As a result, the initiator provides poor diversity in its manner of use and may, in some cases, involve low propagation efficiency of flame energy to a gas-generating material contained in an inflator or poor workability in terms of connection of a connector to the electrode pins.

DISCLOSURE OF THE INVENTION

To solve the above-mentioned problems, the present invention provides an initiator incorporated in an inflator and adapted to trigger the inflator through propagation of flame from an initiating explosive to a gas generator of the inflator, wherein the initiator comprises a single closed-bottomed tubular capsule for accommodating the initiating explosive, and a tubular portion itself of the capsule comprises a plurality of rupture-accelerating means for accelerating rupture upon ignition of the initiating explosive.

With this configuration, the plurality of rupture-accelerating means accelerates rupture of the tubular portion of the capsule upon ignition of the initiating explosive contained in the capsule. Therefore, in the case where the gas generator (gas-generating material) of the inflator is disposed outside the tubular portion of the capsule, flame energy can be efficiently propagated from the initiating explosive to the gas generator (gas-generating material) of the inflator, thereby enhancing a trigger action (ignitability) of the gas generator (gas-generating material) in the inflator.

The present invention also provides an initiator incorporated in an inflator and adapted to trigger the inflator through propagation of flame from an initiating explosive to a gas generator of the inflator, wherein the initiator comprises a single closed-bottomed tubular capsule for accommodating the initiating explosive, and a corner connection portion itself of the capsule, which portion connects a tubular portion and a bottom portion of the capsule, comprises a plurality of rupture-accelerating means for accelerating rupture upon ignition of the initiating explosive.

With this configuration, the plurality of rupture-accelerating means accelerates rupture of the corner connection portion, which connects the tubular portion and the bottom portion of the capsule, upon ignition of the initiating explosive contained in the capsule. Therefore, in the case where the gas generator (gas-generating material) of the inflator is disposed outside the corner connection portion of the capsule, flame energy can be efficiently propagated from the initiating explosive to the gas generator (gas-generating material) of the inflator, thereby enhancing a trigger action (ignitability) of the gas generator (gas-generating material) in the inflator.

When the present invention is practiced, the capsule may comprise guide means for guiding detonation force induced from ignition of the initiating explosive toward the rupture-accelerating means. In this case, since the guide means guides detonation force toward the rupture-accelerating means, the rupture-accelerating means is enhanced in terms of acceleration of rupture.

When the present invention is practiced, the rupture-accelerating means may be strength-weakening means configured such that strength of the tubular portion of the capsule is weakened as compared with that of the bottom portion of the capsule. In this case, upon ignition of the initiating explosive contained in the capsule, rupture of the tubular portion of the capsule is accelerated by means of the configuration in which strength of the tubular portion of the capsule is weakened as compared with that of the bottom portion of the capsule. Therefore, in the case where the gas generator (gas-generating material) of the inflator is disposed around the tubular portion of the capsule, flame energy can be efficiently propagated from the initiating explosive to the gas generator (gas-generating material) of the inflator, thereby enhancing a trigger action (ignitability) of the gas generator (gas-generating material) in the inflator.

In this case, the strength-weakening means may be a configuration such that the wall thickness of the tubular portion of the capsule is reduced as compared with that of the bottom portion of the capsule, or the strength-weakening means may be a fragile part provided at the tubular portion of the capsule. In this case, the fragile part may be a groove. In the case where the strength-weakening means is reduction of the wall thickness of the tubular portion of the capsule as compared with that of the bottom portion of the capsule, or provision of a fragile part at the tubular portion of the capsule, the strength-weakening means can be implemented by a simple configuration. In the case where the fragile part is a groove, the strength-weakening means can be implemented by a simple and inexpensive configuration.

The strength-weakening means may be a configuration such that the bottom portion of the capsule convexly protrudes into the interior of the capsule so as to relatively weaken strength of the tubular portion. In this case, since impartment of a convex shape to the bottom portion of the capsule enhances rigidity of the bottom portion, rupture of the tubular portion of the capsule precedes rupture of the bottom portion of the capsule. Therefore, in the case where the gas generator (gas-generating material ) of the inflator is disposed around the tubular portion of the capsule, flame energy can be efficiently propagated from the initiating explosive to the gas generator (gas-generating material) of the inflator, thereby enhancing a trigger action (ignitability) of the gas generator (gas-generating material) in the inflator.

In this case, a fragile part may be provided at the tubular portion of the capsule and is biased toward the bottom portion of the capsule from a position corresponding to the tip of a convex shape of the bottom portion. In this case, the fragile part may be a groove. In this case, the fragile part of the tubular portion accelerates rupture of the tubular portion, thereby enhancing the efficiency of propagation of flame energy from the initiating explosive to the gas generator (gas-generating material) of the inflator. When the fragile part is a groove, the fragile part can be implemented by a simple and inexpensive configuration.

When the present invention is practiced, the rupture-accelerating means may be detonation-force-enhancing means implemented such that detonation force to be imposed on the tubular portion of the capsule is greater than that to be imposed on the bottom portion of the capsule. In this case, by means of the detonation-force-enhancing means, the detonation force to be imposed on the tubular portion of the capsule is made greater than that to be imposed on the bottom portion of the capsule. Thus, it is possible to surely rupture the tubular portion of the capsule upon ignition of the initiating explosive contained in the capsule. Therefore, in the case where the gas generator (gas-generating material) of the inflator is disposed around the tubular portion of the capsule, flame energy can be reliably and efficiently propagated from the initiating explosive to the gas generator (gas-generating material) of the inflator, thereby enhancing a trigger action (ignitability) of the gas generator (gas-generating material) in the inflator.

In this case, the detonation-force-enhancing means may be implemented such that the amount of an initiating explosive for rupturing the tubular portion of the capsule is greater than that of an initiating explosive for rupturing the bottom portion of the capsule or such that an initiating explosive for rupturing the tubular portion of the capsule is greater in detonation force than an initiating explosive for rupturing the bottom portion of the capsule. In these cases, the detonation force imposed on the tubular portion of the capsule can be made greater than that imposed on the bottom portion of the capsule in a simple manner.

BEST MODE FOR CARRYING OUT THE INVENTION

Figure 1:
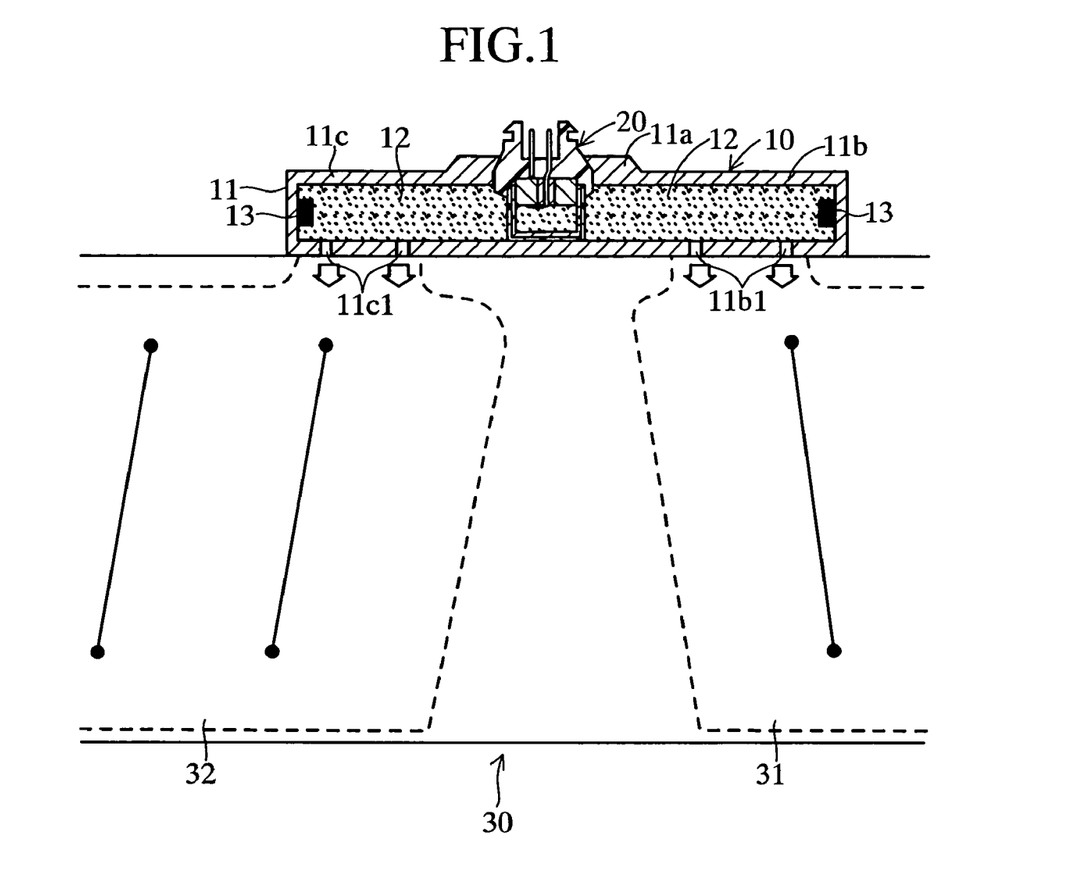
FIG. 1 is a schematic side view with a partial cross section, showing an embodiment of an initiator according to the present invention.

An embodiment of the present invention will now be described with the drawings. FIG. 1 shows an embodiment in which an initiator 20 according to an embodiment of the present invention is incorporated in an inflator for use in an air bag apparatus for protecting heads of persons sitting in front and rear seats of a vehicle. The inflator 10 includes a mounting portion 11a for mounting the initiator 20 and a casing 11. The mounting portion 11a is located at a longitudinally central portion of the inflator 10. The casing 11 includes a large chamber 11b and a small chamber 11c, which are located on the front and rear sides, respectively, of the mounting portion 11a and each contain a gas-generating material 12 and a combustion accelerator 13.

The casing 11 is disposed along the front-rear direction of a vehicle. The large-volume chamber 11b has gas outlet holes 11b1 through which gas is discharged into a front-seat-side inflation portion 31 of an air bag 30. The small-volume chamber 11c has gas outlet holes 11c1 through which gas is discharged into a rear-seat-side inflation portion 32 of the air bag 30. The gas-generating materials 12 are ignited and combust upon exposure to flame energy propagated from the initiator 20 upon ignition of the initiator 20 and are disposed in opposition to each other with respect to the initiator 20. The combustion accelerators 13 are highly ignitable explosive (similar to that used as an initiating explosive 25 of the initiator 20, which will be described later), accelerate combustion of the corresponding gas-generating materials 12, and are disposed in the corresponding gas-generating materials 12 at corresponding end portions (front and rear end portions within the casing 11) located away from the initiator 20.

Figure 2:
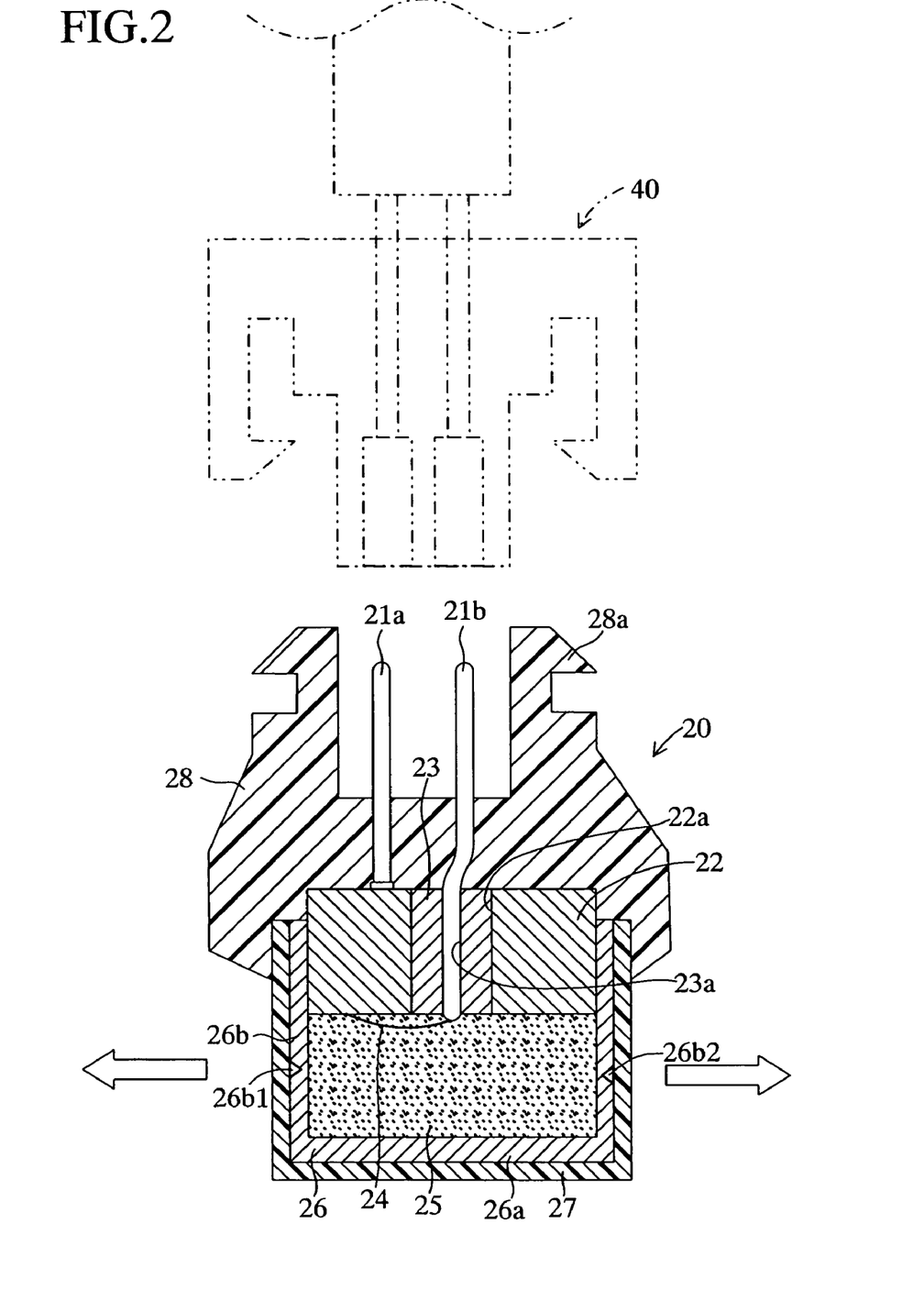
FIG. 2 is an enlarged sectional view showing the initiator of FIG. 1.

As shown in the enlarged view of FIG. 2, the initiator 20 includes a pair of electrode pins 21a and 21b; a conductive header 22; an insulating member 23; a bridge wire 24; an initiating explosive (powder) 25; a metallic capsule 26; a resin capsule 27; and a resin mold 28.

One electrode pin 21a is integrally attached to the conductive header 22. A portion (a portion extending through and out from the resin mold 28) of the electrode pin 21a to be connected to a connector 40 illustrated by the imaginary line in FIG. 2 extends in the vertical direction in FIG. 2. The other electrode pin 21b is integrally attached to the conductive header 22 via the insulating member 23. A portion (a portion extending through and out from the resin mold 28) of the electrode pin 21b to be connected to the connector 40 extends in the vertical direction in FIG. 2.

The conductive header 22 is formed from an electrically conductive metal into a cylindrical shape and has a hole 22a formed therein coaxially. The insulating member 23 is formed into a cylindrical shape and has a through-hole 23a formed therein coaxially. The electrode pin 21b is tightly fitted into the through-hole 23a to thereby be coaxially fixed in place in the insulating member 23. The insulating member 23 is of heat-resistant, pressure-resistant glass and is tightly fitted into the hole 22a of the conductive header 22 to thereby be coaxially fixed in place in the conductive header 22.

The bridge wire 24 is connected to the electrode pin 21b and to the conductive header 22, thereby indirectly bridging the electrode pins 21a and 21b. Upon energization through the electrode pins 21a and 21b, the bridge wire 24 generates heat to thereby ignite the initiating explosive 25. The initiating explosive 25, together with the bridge wire 24, is contained in the metallic capsule 26 in a sealed condition while being partially in contact with the bridge wire 24.

The metallic capsule 26 is formed into a closed-bottomed tubular shape (a cuplike shape) and is configured such that the wall thickness of a tubular portion 26b is reduced as compared with that of a bottom portion 26a, whereby the tubular portion 26b is rupturable upon ignition of the initiating explosive 25. An opening end portion of the metallic capsule 26 is hermetically attached, through welding or the like, to the outer circumferential surface of the conductive header 22. Grooves 26b1 and 26b2 each having a V-shaped cross section are provided on the outer surface of the tubular portion 26b of the metallic capsule 26 at the right and left positions in FIG. 2 (two positions located in opposition to each other with respect to the axis of the tubular portion 26b). The grooves 26b1 and 26b2 serve as the rupture-accelerating means, the strength-weakening means, or the fragile part, for accelerating rupture of the tubular portion 26b which arises upon ignition of the initiating explosive 25.

The resin capsule 27 is formed into a closed-bottomed tubular shape (a cuplike shape) and is fitted to the metallic capsule 26 in such a manner as to rupture when a part of the tubular portion 26b of the metallic capsule 26 ruptures upon ignition of the initiating explosive 25. The resin mold 28 is molded in such a manner as to integrally retain connections between component parts such as the electrode pins 21a and 21b, the conductive header 22, the insulating member 23, the metallic capsule 26, and the resin capsule 27. A connecting portion 28a for connection to the connector 40 is formed at an end portion of the resin mold 28.

The thus-configured initiator 20 of the present embodiment operates in the following manner. Upon ignition of the initiating explosive 25 as a result of energization of the bridge wire 24, the tubular portion 26b of the metallic capsule 26 ruptures at the two right-and-left positions (the positions where the grooves 26b1 and 26b2 are formed) in FIG. 2. As a result, the resin capsule 27 ruptures, and flame propagates from the initiating explosive 25 to the opposite gas-generating materials 12 along two opposite directions, or right and left directions in FIG. 2.

Therefore, in the case where, as shown in FIG. 1, the gas-generating materials 12 of the inflator 10 are disposed outside the tubular portion 26b of the metallic capsule 26, flame energy can be efficiently propagated from the initiating explosive 25 of the initiator 20 to the gas-generating materials 12 of the inflator 10, thereby enhancing the ignitability of the gas-generating materials 12 in the inflator 10.

In the above-described embodiment, as shown in FIG. 2, the metallic capsule 26 of the initiator 20 assumes a closed-bottomed tubular shape composed of the bottom portion 26a and the tubular portion 26b. However, component parts of the initiator 20 can be modified as shown in FIGS. 3 to 7. The following description of modified embodiments covers those component parts of the initiator 20 whose shapes are modified. Also, those component parts whose shapes remain unchanged are denoted by common reference numerals among the above-described embodiment and the modified embodiments to be described below, and repeated description thereof is omitted.

Figure 3:
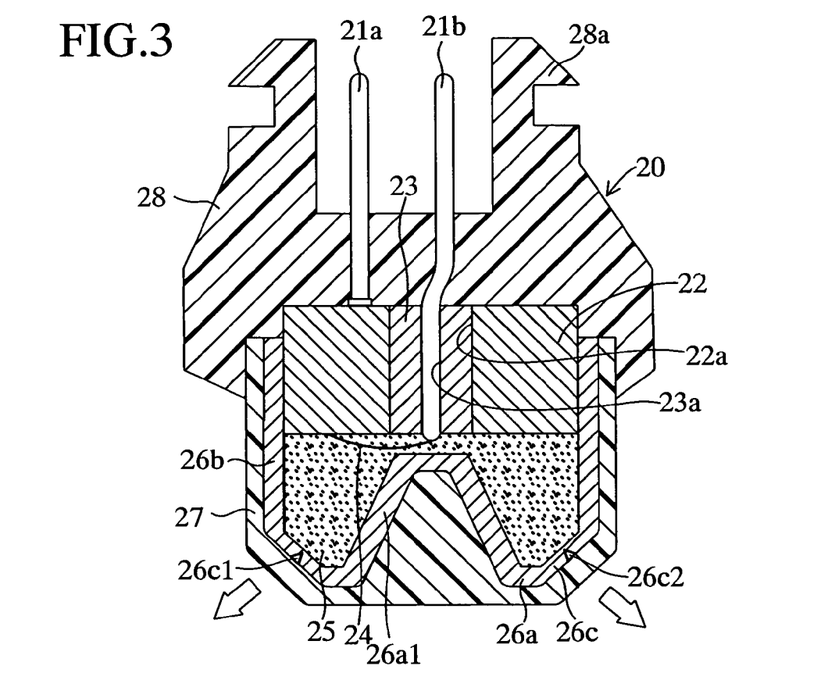
FIG. 3 is a sectional view showing a first modified embodiment of the initiator of FIG. 2.

In the modified embodiment shown in FIG. 3, the metallic capsule 26 of the initiator 20 includes the bottom portion 26a, the tubular portion 26b, and a corner connection portion 26c, which connects the bottom portion 26a and the tubular portion 26b. The wall thickness of the corner connection portion 26c is reduced as compared with that of the bottom portion 26a and that of the tubular portion 26b, whereby the corner connection portion 26c is rupturable upon ignition of the initiating explosive 25.

Grooves 26c1 and 26c2 each having a V-shaped cross section are provided on the inclined surface of the corner connection portion 26c of the metallic capsule 26 at the right and left positions in FIG. 3. The grooves 26c1 and 26c2 serve as the rupture-accelerating means, the strength-weakening means, or the fragile part, for accelerating rupture of the corner connection portion 26c which arises upon ignition of the initiating explosive 25. A taper portion 26a1 assuming a convex shape is formed on the bottom portion 26a such that a tip part thereof protrudes upward in FIG. 3 into the interior of the metallic capsule 26 beyond a position corresponding to the grooves 26c1 and 26c2. The taper portion 26a1 functions to enhance strength of the bottom portion 26a and functions as guide means for guiding detonation force induced from ignition of the initiating explosive 25 toward portions of metallic capsule 26 where the grooves 26c1 and 26c2 are formed.

The thus-configured embodiment of FIG. 3 operates in the following manner. Upon ignition of the initiating explosive 25 as a result of energization of the bridge wire 24, the corner connection portion 26c of the metallic capsule 26 ruptures at the two right-and-left positions (the positions where the grooves 26c1 and 26c2 are formed) in FIG. 3. As a result, the resin capsule 27 ruptures, and flame propagates from the initiating explosive 25 to the opposite gas-generating materials 12 along two directions substantially perpendicular to the inclined surface of the corner connection portion 26c.

Therefore, in the case where the gas-generating materials 12 of the inflator 10 are disposed outside the tubular portion 26b of the metallic capsule 26 and along directions substantially perpendicular to the inclined surface of the corner connection portion 26c, flame energy can be efficiently propagated from the initiating explosive 25 of the initiator 20 to the gas-generating materials 12 of the inflator 10, thereby enhancing the ignitability of the gas-generating materials 12 in the inflator 10.

Figure 4:
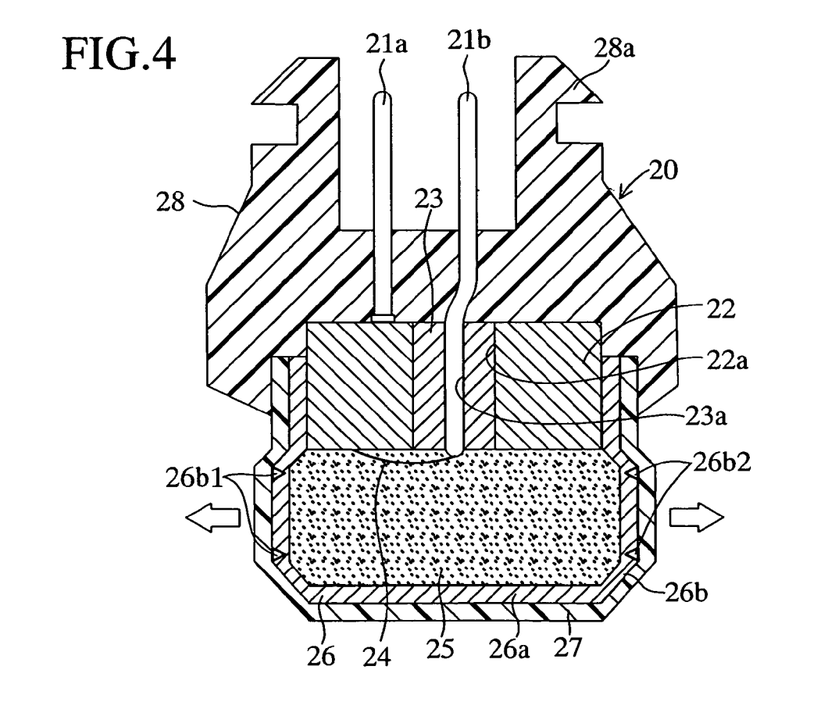
FIG. 4 is a sectional view showing a second modified embodiment of the initiator of FIG. 2.

In the modified embodiment shown in FIG. 4, the metallic capsule 26 of the initiator 20 includes the bottom portion 26a and the tubular portion 26b and is configured such that the wall thickness of the tubular portion 26b is reduced as compared with that of the bottom portion 26a, whereby the tubular portion 26b is rupturable upon ignition of the initiating explosive 25. Also, an intermediate part of the tubular portion 26b is swollen, and grooves 26b1 and 26b2 each having a V-shaped cross section are provided on the outer surface of the swollen part at the right and left positions in FIG. 4. The grooves 26b1 and 26b2 serve as the rupture-accelerating means, the strength-weakening means, or the fragile part, for accelerating rupture of the tubular portion 26b which arises upon ignition of the initiating explosive 25. The swollen part of the tubular portion 26b functions to reduce strength of the tubular portion 26b and functions as guide means for guiding detonation force induced from ignition of the initiating explosive 25 toward portions of metallic capsule 26 where the grooves 26b1 and 26b2 are formed. The thus-configured embodiment of FIG. 4 operates in the following manner. Upon ignition of the initiating explosive 25 as a result of energization of the bridge wire 24, the tubular portion 26b of the metallic capsule 26 ruptures at the two right-and-left positions (the positions where the grooves 26b1 and 26b2 are formed) in FIG. 4. As a result, the resin capsule 27 ruptures, and flame propagates from the initiating explosive 25 to the opposite gas-generating materials 12 along two opposite directions, or right and left directions in FIG. 4.

Therefore, in the case where, as shown in FIG. 1, the gas-generating materials 12 of the inflator 10 are disposed outside the tubular portion 26b of the metallic capsule 26, flame energy can be efficiently propagated from the initiating explosive 25 of the initiator 20 to the gas-generating materials 12 of the inflator 10, thereby enhancing the ignitability of the gas-generating materials 12 in the inflator 10.

Figure 5:
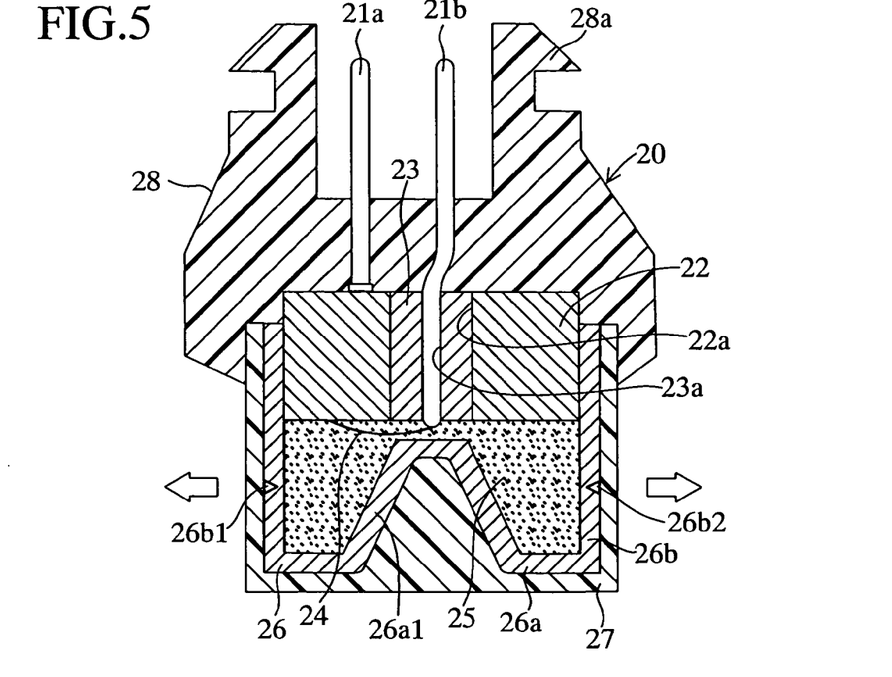
FIG. 5 is a sectional view showing a third modified embodiment of the initiator of FIG. 2.

In the modified embodiment shown in FIG. 5, the metallic capsule 26 of the initiator 20 includes the bottom portion 26a and the tubular portion 26b and is configured such that the wall thickness of the tubular portion 26b is reduced as compared with that of the bottom portion 26a, whereby the tubular portion 26b is rupturable upon ignition of the initiating explosive 25. Grooves 26b1 and 26b2 each having a V-shaped cross section are provided on the outer surface of the tubular portion 26b of the metallic capsule 26 at the right and left positions in FIG. 5. The grooves 26b1 and 26b2 serve as the rupture-accelerating means, the strength-weakening means, or the fragile part, for accelerating rupture of the tubular portion 26b which arises upon ignition of the initiating explosive 25.

A taper portion 26a1 assuming a convex shape is formed on the bottom portion 26a such that a tip part thereof protrudes upward in FIG. 5 into the interior of the metallic capsule 26 beyond a position corresponding to the grooves 26b1 and 26b2. The taper portion 26a1 functions to enhance strength of the bottom portion 26a so as to relatively weaken strength of the tubular portion 26b and functions as guide means for guiding detonation force induced from ignition of the initiating explosive 25 toward portions of metallic capsule 26 where the grooves 26b1 and 26b2 are formed.

The thus-configured embodiment of FIG. 5 operates in the following manner. Upon ignition of the initiating explosive 25 as a result of energization of the bridge wire 24, the tubular portion 26b of the metallic capsule 26 ruptures at the two right-and-left positions (the positions where the grooves 26b1 and 26b2 are formed) in FIG. 5. As a result, the resin capsule 27 ruptures, and flame propagates from the initiating explosive 25 to the opposite gas-generating materials 12 along two opposite directions, or right and left directions in FIG. 5.

Therefore, in the case where, as shown in FIG. 1, the gas-generating materials 12 of the inflator 10 are disposed outside the tubular portion 26b of the metallic capsule 26, flame energy can be efficiently propagated from an ignition portion (initiating explosive 25) of the initiator 20 to the gas-generating materials 12 of the inflator 10, thereby enhancing the ignitability of the gas-generating materials 12 in the inflator 10. Notably, in the present embodiment, a pair of right and left bridge wires 24 can be provided.

Figure 6:
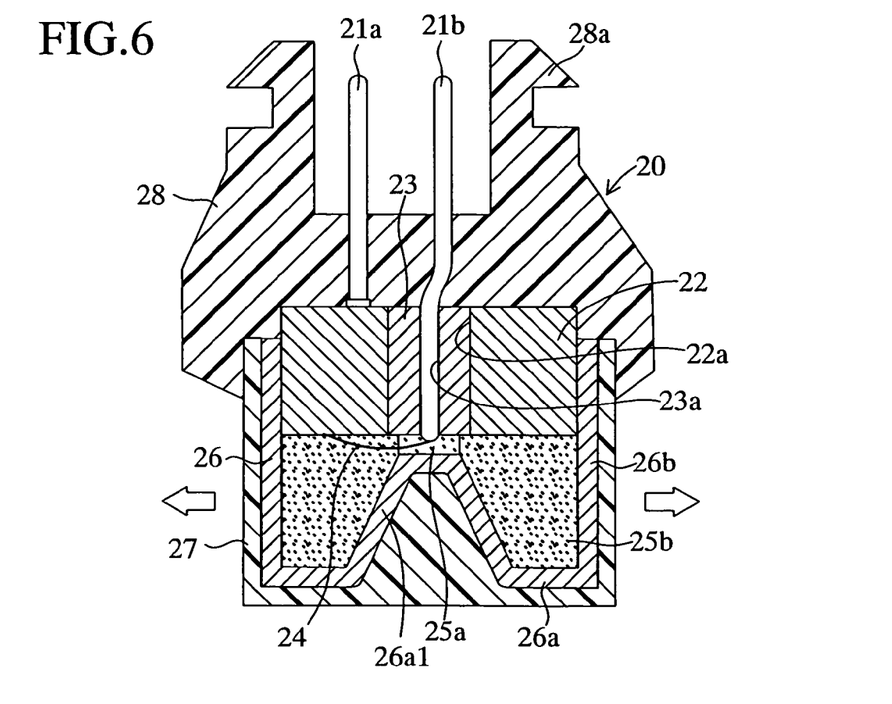
FIG. 6 is a sectional view showing a fourth modified embodiment of the initiator of FIG. 2.

In the modified embodiment shown in FIG. 6, the metallic capsule 26 of the initiator 20 includes the bottom portion 26a and the tubular portion 26b and is configured such that the bottom portion 26a and the tubular portion 26b has substantially the same wall thickness. The taper portion 26a1 assuming a convex shape is formed on the bottom portion 26a in such a manner as to protrude into the interior of the metallic capsule 26. The taper portion 26a1 functions to enhance strength of the bottom portion 26a so as to relatively weaken strength of the tubular portion 26b and functions as guide means for guiding detonation force induced from ignition of the initiating explosive 25 toward the tubular portion 26b.

In the present embodiment, formation of the taper portion 26a1 on the bottom portion 26b renders the amount of an initiating explosive 25b for rupturing the tubular portion 26b greater than that of an initiating explosive 25a for rupturing the bottom portion 26a, so that detonation force to be imposed on the tubular portion 26b is greater than that to be imposed on the bottom portion 26a. Therefore, upon ignition of the initiating explosives 25a and 25b contained in the metallic capsule 26, the tubular portion 26b of the metallic capsule 26 can be reliably ruptured. Thus, in the case where the gas-generating materials 12 of the inflator 10 are disposed outside the tubular portion 26b of the metallic capsule 26, flame energy can be efficiently propagated from the initiating explosives 25a and 25b to the corresponding gas-generating materials 12 of the inflator 10, thereby enhancing the ignitability of the gas-generating materials 12 in the inflator 10.

In the above-described embodiment of FIG. 6, the initiating explosive 25b for rupturing the tubular portion 26b can be rendered greater in detonation force than the initiating explosive 25a for rupturing the bottom portion 26a, so that detonation force to be imposed on the tubular portion 26b can become greater than that to be imposed on the bottom portion 26a. Notably, in the embodiment of FIG. 6, a pair of right and left bridge wires 24 can be provided.

Figure 7:
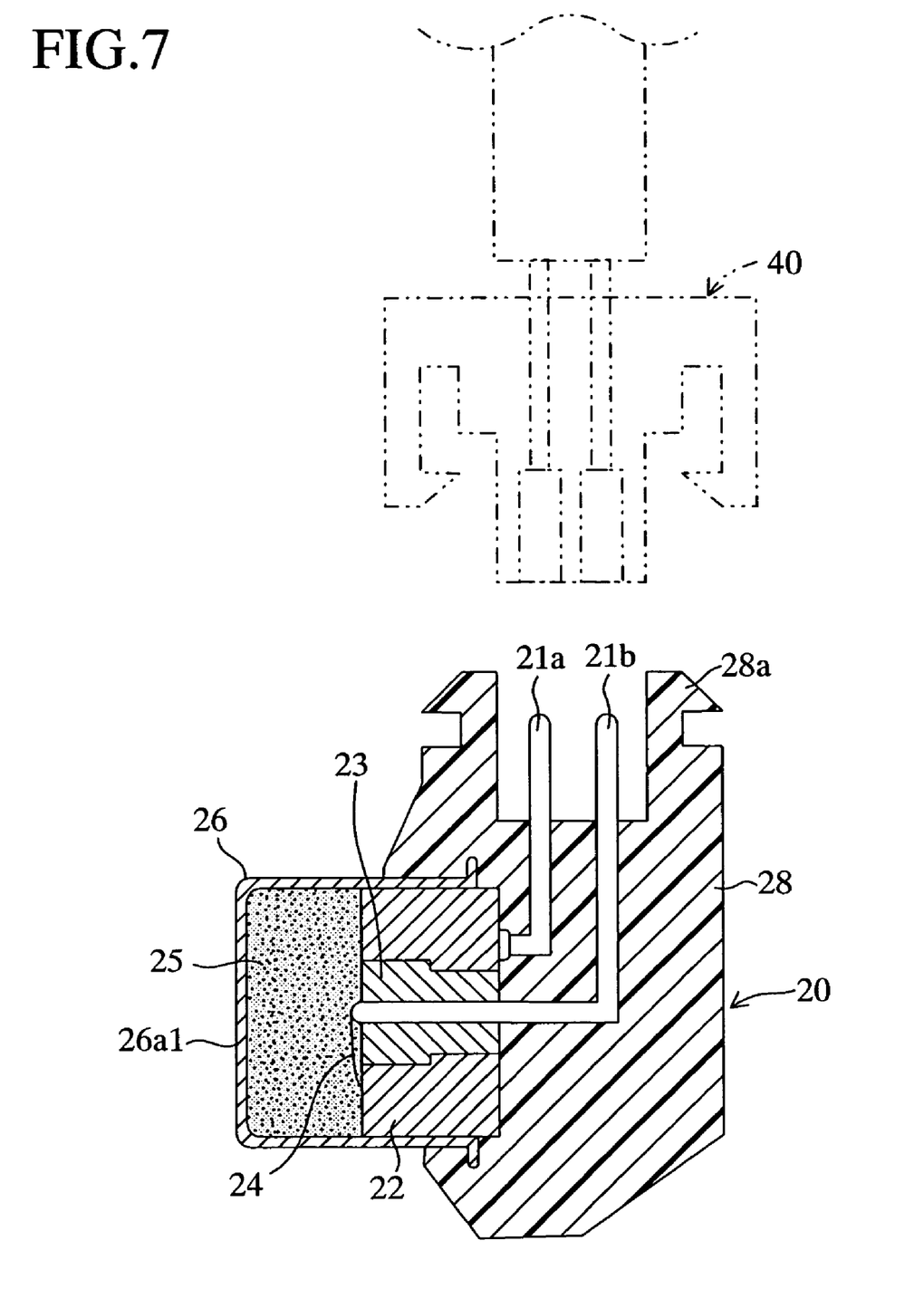
FIG. 7 is a sectional view showing a fifth modified embodiment of the initiator of FIG. 2.

In the initiators 20 of the above-described embodiments (shown in FIGS. 2 to 6), portions of the electrode pins 21a and 21b to be connected to the connector 40 extend along the axis of the conductive header 22, the insulating member 23, the metallic capsule 26, and the resin capsule 27. However, as shown in FIG. 7, portions of the electrode pins 21a and 21b to be connected to the connector 40 may extend perpendicularly to the axis of the conductive header 22, the insulating member 23, and the metallic capsule 26, whereby workability in terms of connection of the connector 40 to the electrode pins 21a and 21b can be enhanced. Notably, in the initiator 20 shown in FIG. 7, the resin capsule 27 is not provided, and the bottom portion 26a of the metallic capsule 26 ruptures, so that flame propagates to an inflator along the axis of the conductive header 22, the insulating member 23, and the metallic capsule 26.

In the initiators 20 of the above-described embodiments (shown in FIGS. 2 to 6), upon ignition of the initiating explosive 25, flames propagates along two directions from the initiating explosive 25 to the opposite gas-generating materials 12 of the inflator 10. However, the initiator 20 may be configured such that, upon ignition of the initiating explosive 25, flame propagates along three or more directions from the initiating explosive 25 to the opposite gas-generating materials 12 of the inflator 10.

In the initiators 20 of the above-described embodiments (shown in FIGS. 2 to 6), the metallic capsule 26 and the resin capsule 27 are symmetrically formed. However, the metallic capsule 26 and the resin capsule 27 may be asymmetrically formed.

Figure 8:
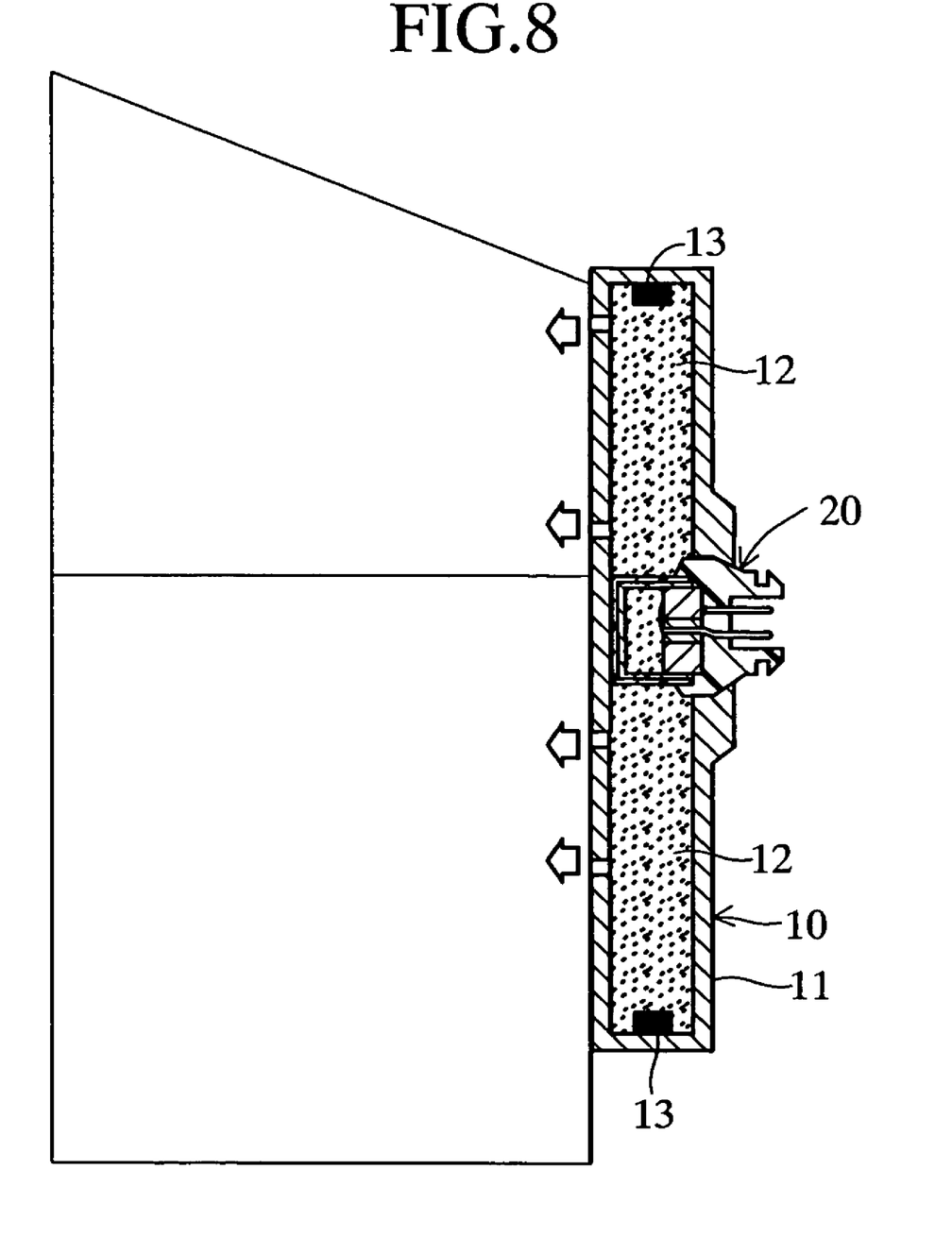
FIG. 8 is a schematic side view with a partial cross section, showing another embodiment of an initiator according to the present invention.

The initiators 20 of the above-described embodiments (shown in FIGS. 1 to 7) are each incorporated in the inflator 10 for use in an air bag apparatus for protecting heads of persons sitting in front and rear seats of a vehicle. However, as shown in FIG. 8, the initiator 20 of the present invention can be incorporated in the inflator 10 for use in a side air bag apparatus for protecting a side body region of person sitting in a vehicle.

The above embodiments (shown in FIGS. 1 to 7) are described while mentioning the initiator 20 for use in the inflator 10 that employs the gas-generating material 12 as the gas generator. However, the initiator 20 of the present invention may be used in an inflator employing a gas generator that includes high-pressure gas and a gas seal plate for sealing in the high-pressure gas. In this case, detonation force induced from ignition of the initiating explosive 25 of the initiator 20 ruptures the gas seal plate, thereby releasing gas from the inflator. Therefore, the initiator 20 of the present invention can enhance a trigger action of the gas generator in the inflator.

The invention claimed is:

1. An initiator incorporated in an inflator and adapted to trigger the inflator through propagation of flame from an initiating explosive to a gas generator of the inflator, wherein the initiator comprises a single capsule for accommodating the initiating explosive, the capsule having a tubular side portion and a closed bottom portion, the tubular side portion comprising a pair of grooves located on a surface of the tubular side portion in opposition to each other with respect to a longitudinal axis of the tubular side portion, the pair of grooves being configured to accelerate rupture of the tubular side portion and to propagate the flame in opposite directions upon ignition of the initiating explosive.

2. An initiator according to claim 1, wherein the initiator comprises a corner connection portion of the tubular capsule, the corner connection portion connects the tubular side portion and the bottom portion of the capsule, the corner connection portion having the pair of grooves.

3. An initiator according to claim 2, wherein the capsule comprises a taper portion for guiding detonation force induced from ignition of the initiating explosive toward the pair of grooves.

4. An initiator according to claim 1, wherein the capsule further comprises a taper portion for guiding detonation force induced from ignition of the initiating explosive toward the pair of grooves.

5. An initiator according to claim 1, wherein the strength of the tubular side portion of the capsule is less than that of the closed bottom portion of the capsule.

6. An initiator according to claim 5, wherein a wall thickness of the tubular side portion of the capsule is smaller than a wall thickness of the closed bottom portion of the capsule.

7. An initiator according to claim 5, wherein the closed bottom portion of the capsule convexly protrudes into an interior of the capsule so as to weaken the strength of the tubular side portion.

8. An initiator according to claim 7, wherein the pair of grooves are biased toward the closed bottom portion of the capsule from a position corresponding to a tip of a convex shape of the closed bottom portion.

9. An initiator according to claim 1, further comprising a detonation-force-enhancing device implemented such that detonation force to be imposed on the tubular side portion of the capsule is greater than that to be imposed on the closed bottom portion of the capsule.

10. An initiator according to claim 9, wherein the detonation-force-enhancing device is implemented such that the amount of an initiating explosive for rupturing the tubular side portion of the capsule is greater than that of an initiating explosive for rupturing the closed bottom portion of the capsule.

11. An initiator according to claim 9, wherein the detonation-force-enhancing device is implemented such that an initiating explosive for rupturing the tubular side portion of the capsule is greater in detonation force than an initiating explosive for rupturing the closed bottom portion of the capsule.

12. An initiator according to claim 1, wherein the pair of grooves have a V-shaped cross section.

13. An inflator comprising:

a casing having two chambers, each chamber enclosing gas-generating materials and combustion accelerators; and an initiator incorporated into the casing at a longitudinally central portion of the casing, the initiator adapted to trigger the inflator through propagation of flame from an initiating explosive to the gas-generating materials and the combustion accelerators in each of the chambers, wherein the two chambers of the casing are disposed on one and the other sides, respectively, of the initiator so as to be in opposition to each other with respect to the initiator, and the initiator includes a single capsule for accommodating the initiating explosive, the capsule having a tubular side portion and a closed bottom portion, the tubular side portion comprising a pair of grooves located on a surface of the tubular side portion in opposition to each other with respect to a longitudinal axis of the tubular side portion, the pair of grooves being configured to accelerate rupture of the tubular side portion and to propagate the flame in opposite directions toward the gas-generating materials and the combustion accelerators in the respective chambers upon ignition of the initiating explosive.

14. An initiator according to claim 13, wherein the initiator is T-shaped, the stem of the T-shaped initiator being formed by the initiator, and the arms of the T-shaped initiator being formed by the two chambers of the casing, respectively.

15. An initiator according to claim 13, wherein the inflator is incorporated into an airbag apparatus of a vehicle, the airbag apparatus being positioned to protect the heads of persons sitting, respectively, in front and rear seats of the vehicle.

16. An initiator according to claim 13, wherein the inflator is incorporated into a side airbag apparatus of a vehicle, the side airbag apparatus being positioned to protect a side body region of a person sitting in the vehicle.

* * * * *